United States Patent
Clark

(10) Patent No.: US 7,869,377 B2
(45) Date of Patent: * Jan. 11, 2011

(54) METHOD FOR ESTIMATING A SUBJECTIVE QUALITY OF A SIGNAL

(75) Inventor: Alan Douglas Clark, Duluth, GA (US)

(73) Assignee: Telchemy, Inc., Duluth, GA (US)

( * ) Notice: Subject to any disclaimer, the term of this patent is extended or adjusted under 35 U.S.C. 154(b) by 902 days.

This patent is subject to a terminal disclaimer.

(21) Appl. No.: 11/426,492

(22) Filed: Jun. 26, 2006

(65) Prior Publication Data

US 2007/0140134 A1 Jun. 21, 2007

Related U.S. Application Data

(63) Continuation of application No. 09/574,472, filed on May 19, 2000, now Pat. No. 7,075,981.

(51) Int. Cl.
*G01R 31/08* (2006.01)

(52) U.S. Cl. .................. 370/252; 370/310; 455/422.1

(58) Field of Classification Search ............ None
See application file for complete search history.

(56) References Cited

U.S. PATENT DOCUMENTS

| | | | |
|---|---|---|---|
| 4,381,546 A | 4/1983 | Armstrong | |
| 4,663,748 A * | 5/1987 | Karbowiak et al. | 370/224 |
| 5,446,492 A | 8/1995 | Wolf et al. | |
| 5,598,431 A | 1/1997 | Lobel | |
| 5,710,791 A | 1/1998 | Royer et al. | |
| 5,768,527 A | 6/1998 | Zhu et al. | |
| 5,867,813 A * | 2/1999 | Di Pietro et al. | 704/202 |
| 5,961,599 A | 10/1999 | Kalavade et al. | |
| 6,304,634 B1 | 10/2001 | Hollier et al. | |
| 6,363,053 B1 | 3/2002 | Schuster et al. | |
| 6,370,120 B1 | 4/2002 | Hardy | |
| 6,512,746 B1 | 1/2003 | Sand | |
| 6,657,957 B1 | 12/2003 | Cheung et al. | |
| 6,665,271 B1 | 12/2003 | Thomas et al. | |

(Continued)

FOREIGN PATENT DOCUMENTS

EP   0 579 472 A2   1/1994

OTHER PUBLICATIONS

Johannesson, Nils Olof, "The ETSI Computation Model: A Tool for Transmission Planning of Telephone Networks," IEEE Communications Magazine, Jan. 1997, pp. 70-79, vol. 35, No. 1, IEEE Service Center, Piscataway, New Jersey, 10 pps.

(Continued)

*Primary Examiner*—Duc C Ho
(74) *Attorney, Agent, or Firm*—Smith, Gambrell & Russell

(57) ABSTRACT

A method for estimating a subjective quality of a signal carried over a transmission path. The transmission path is monitored at periodic intervals. For each of the periodic intervals, at least one impairment factor is measured, an estimated effect of each of the impairment factors is determined using at least one value, and an estimated subjective quality of the signal is determined using the estimated effect of each of the impairment factors. Further, an estimated combined subjective quality of the signal is determined using the estimated subjective quality for at least two of the periodic intervals.

12 Claims, 6 Drawing Sheets

Multimedia communications system

U.S. PATENT DOCUMENTS

| | | | |
|---|---|---|---|
| 6,741,569 | B1 | 5/2004 | Clark |
| 6,819,924 | B1 | 11/2004 | Ma et al. |
| 7,058,048 | B2 * | 6/2006 | Clark .......................... 370/356 |
| 7,075,981 | B1 * | 7/2006 | Clark .......................... 375/224 |
| 2002/0183059 | A1 * | 12/2002 | Noreen et al. ............... 455/427 |
| 2005/0141493 | A1 * | 6/2005 | Hardy et al. ................ 370/356 |

OTHER PUBLICATIONS

Hollier, Mike, Dr., "An Experimental Investigation of the Accumulation of Perceived Error in Time-Varying Speech Distortions," 103rd AES Convention, New York, Sep. 1997, International Telecommunication Union: Telecommunication Standardization Sector, Dec. 1997, pp. 1-12, United Kingdom.

Rix, A.W., et al., "Predicting Speech Quality of Telecommunications Systems in a Quality Differentiated Market," Sixth IEE Conference in Telecommunications (ICT'98), Endinburgh, Mar. 31-Apr. 1, 1998, IEE Conference Publication 451, pp. 156-160, BT Laboratories, United Kingdom.

Douskalis, Bill, "IP Telephony: The Integration of Robust VoIP Services," Chapter 4, pp. 223-261, Prentice Hall 2000.

Dempsey, B.J. et al., "An empirical study of packet voice distribution over a campus-wide network," Local Computer Networks, 1994, Proceedings, 19th Conference in Minneapolis, MN, USA, Oct. 2-5, 1994, Oct. 2, 1994, pp. 456-465, IEEE Comput. Soc, Los Alamitos, CA, USA.

Rubin, I. et al., "Voice quality control under dynamic encoding algorithms in ATM networks," Computer Networks and ISDN Systems, vol. 29, No. 3, Feb. 1, 1997, pp. 343-355, North Holland Publishing, Amsterdam, NL.

Sallent, O. et al., "An efficient data transmission policy in an integrated voice-data DS-CDMA network," Vehicular Technology Conference, 1998, VTC 98, 48th IEEE Ottawa, Ont., Canada May 18-21, 1998, May 18, 1998, pp. 2393-2397, IEEE, US, New York, NY, USA.

Cermak, "Speech Quality as a Function of IP Network Performance," T1 Committee Contribution TIAI.7/98-022, Jun. 1998, www.t1.org.

Cermak, "Voice Over IP Speech Quality," T1 Committee Contribution TIAI.7/99-011, May 1999.

Ectel, Quali.net Product Information, www.ectel.com.

Netrue, NeTruedos product information, www.netrue.com.

Boneau and Daily, "Exponential Decay of Episodic Traces in Short Term Recognition Memory," Psychological Association of America, Jun. 1995.

Rosenbluth, "Testing the Quality of Connections Having Time Varying Impairments," AT & T, T1A1.7/ 98-031, Oct. 1998.

Wolf, Stephen et al., "Objective Quality Assessment of Digitally Transmitted Video," IEEE Pacific Rim Conference on Communications, Computers and Signal Processing, May 9-10, 1991, pp. 477-482, U.S. Department of Commerce, Boulder, Colorado.

* cited by examiner

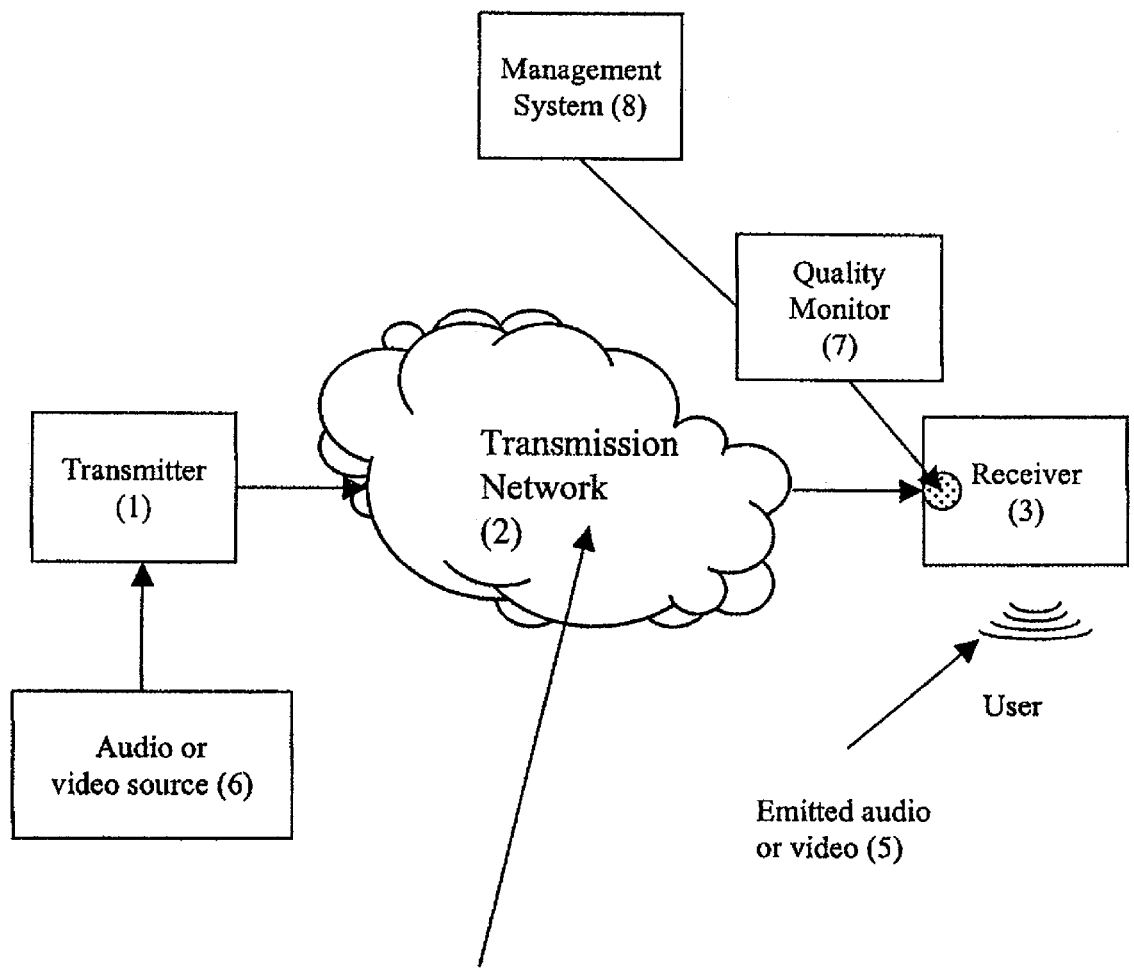
Figure 1 - Multimedia communications system

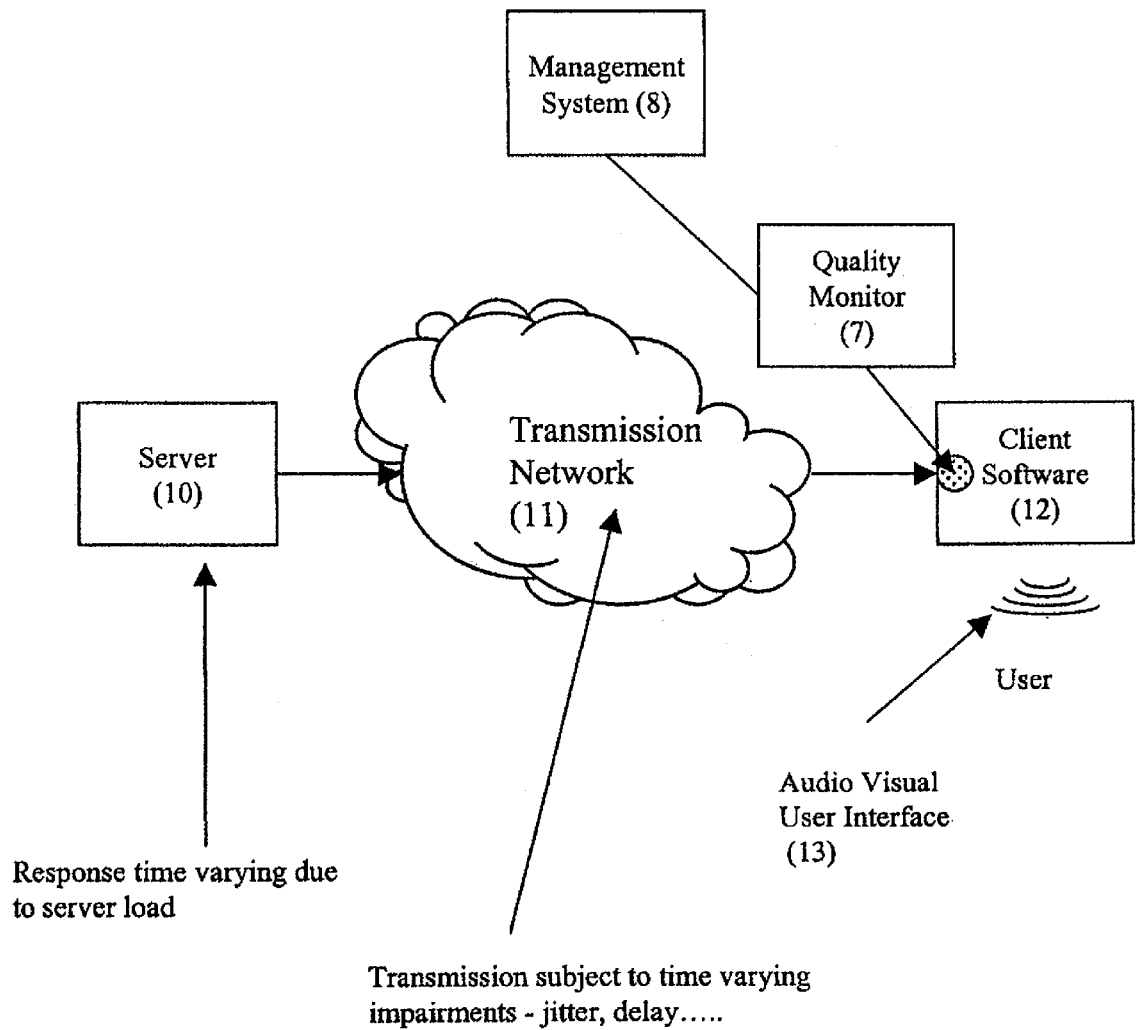
Figure 2 - Distributed Applications Software system

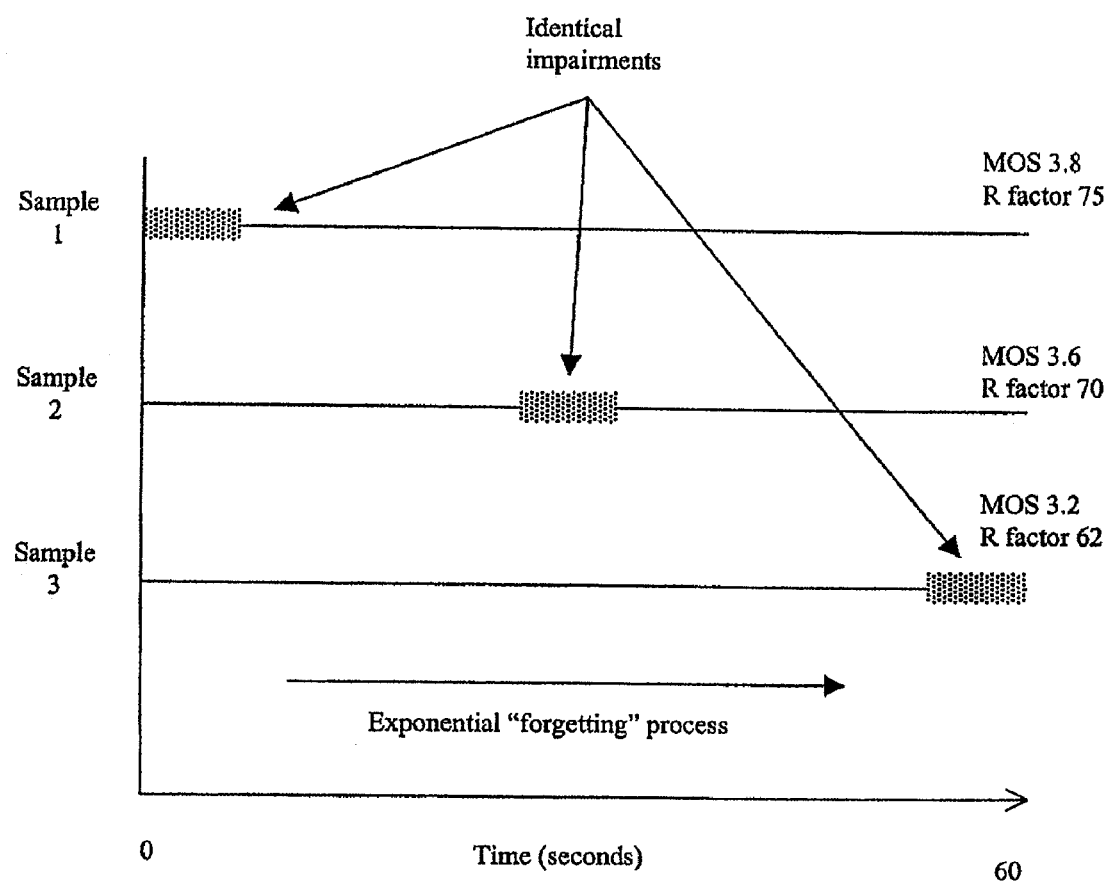
Figure 3 - Effect of temporal location on speech quality

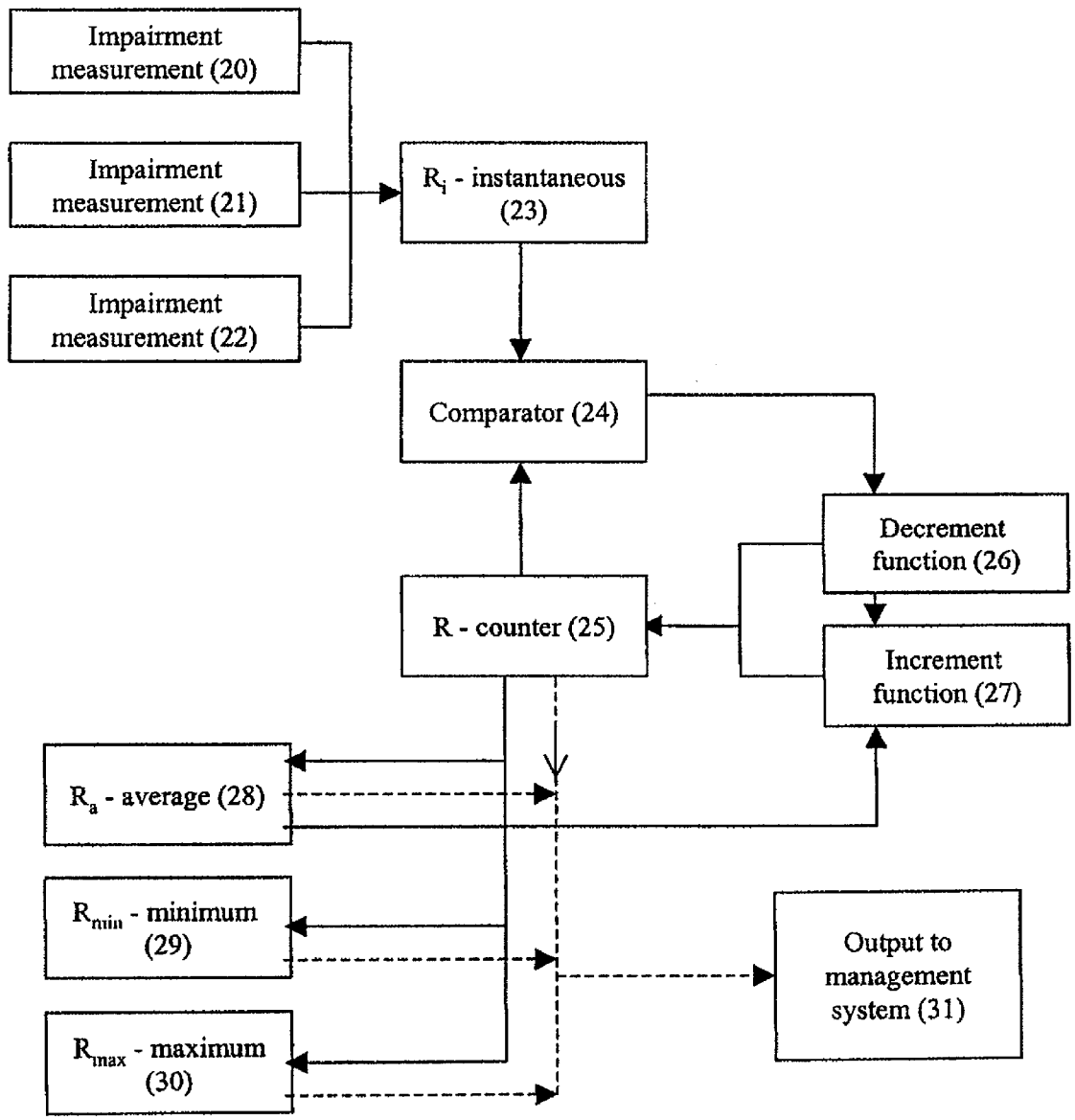
Figure 4 - Architecture of Quality Monitor

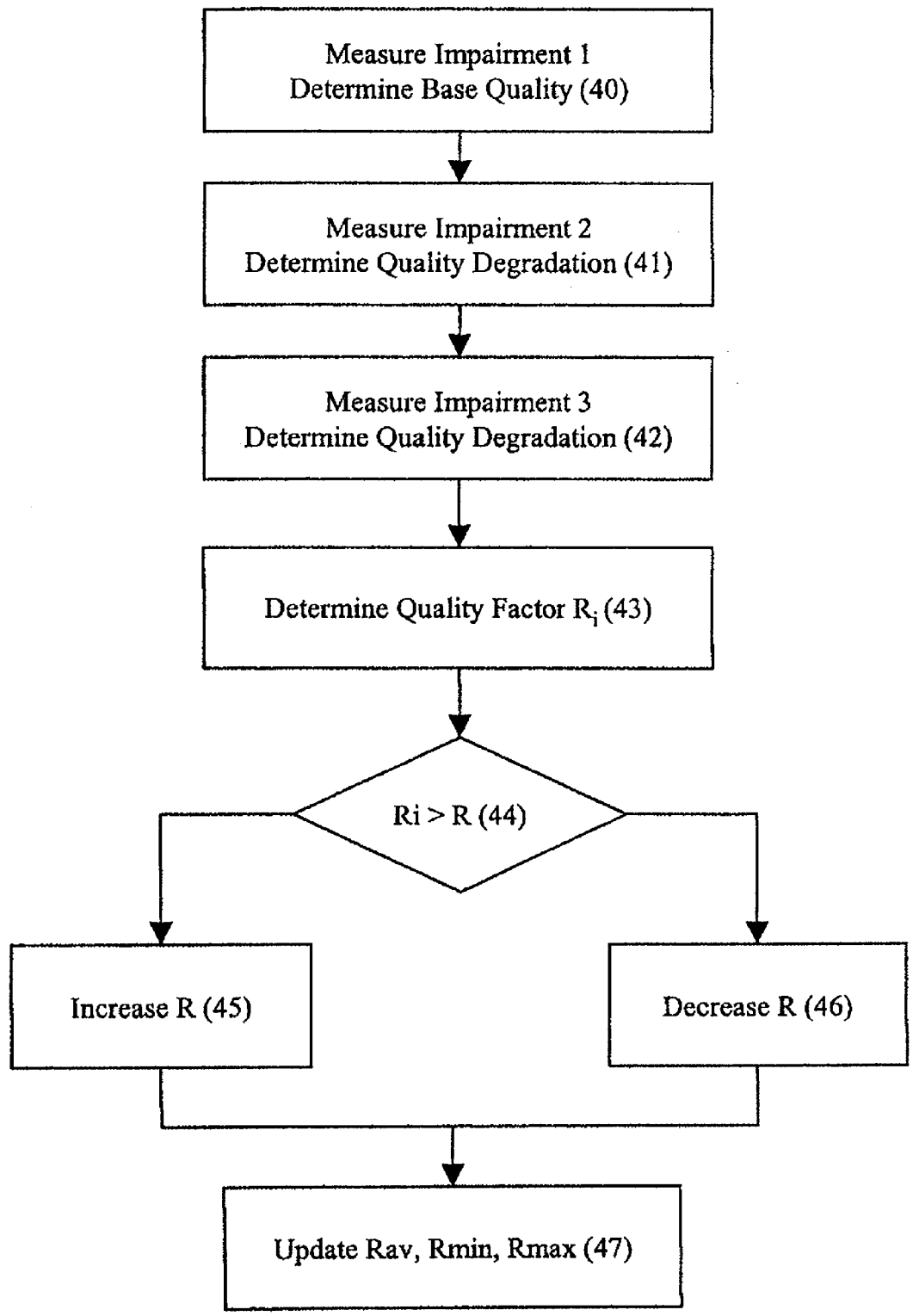
Figure 5 - Flowchart for Quality Estimating System

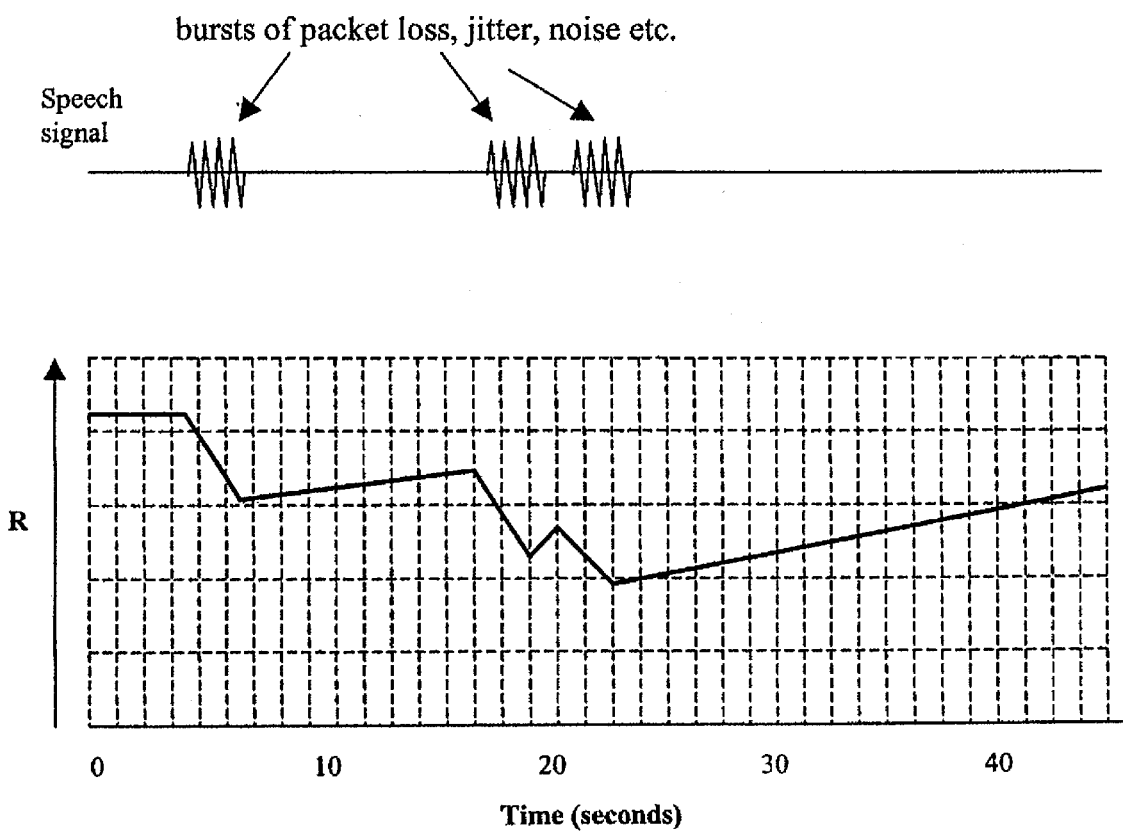
Figure 6 - Example of output from Quality Monitor

US 7,869,377 B2

METHOD FOR ESTIMATING A SUBJECTIVE QUALITY OF A SIGNAL

RELATED APPLICATIONS

This application is a continuation of prior U.S. application Ser. No. 09/574,472, filed May 19, 2000 now U.S. Pat. No. 7,075,981, and describes an alternative and extended means of monitoring certain time related aspects of quality of service to prior U.S. application Ser. No. 09/551,498, filed on Apr. 18, 2000, now U.S. Pat. No. 6,741,569, which are relied on and incorporated herein by reference.

FIELD OF THE INVENTION

This invention relates to methods of estimating the subjective quality of a multimedia communications system or distributed applications software system in which the quality of the received audio, voice, video or the response time of the software system may be degraded by time varying impairments and in which it is accordingly desirable to have some means of measuring or estimating the subjective or perceptual quality of the decoded audio, voice, video or software system.

It is desirable to have some means of measuring the quality of a distributed system in order that it can be verified that the system is operating correctly and that user expectations are being met. In the case of a speech transmission system such as a telephone network this measurement is sometimes made subjectively by using a test group of people or test surveys. The results of a subjective voice quality test are usually given as a Mean Opinion Score (MOS). As it is generally impractical to conduct subjective tests during the normal operation of a speech transmission system objective testing methods have been developed. These use measured statistics related to the speech transmission system to predict a subjective performance level and typically determine an R rating factor.

Modern communications systems often used some form of shared transmission medium, for example wireless, local or wide area packet switched network. This increases the prevalence of time varying transmission impairments unlike the more constant and predictable impairments characteristic of older circuit switched networks.

It has been found during subjective testing that bursts of noise or distortion occurring late in a call have greater effect than the same bursts occurring early in the call, as illustrated in FIG. 3. This effect is thought to be due to the operation of human short-term memory which retains information on the most recent events and remembers detailed information on heard events for typically two minutes. If a series of bursts of noise or distortion occur during a telephone conversation then according to the known and accepted psychological theories of short term memory and recency the user would tend to remember the last burst and have a general recollection of the call quality up to that point. Experiments by Boneau and Daily (Psychological Association of America, 1995) indicate that the short-term memory loss process is exponential in nature.

Current systems for estimating voice quality do not consider the effects of the temporal location of impairments on the user and hence do not give an accurate representation of subjective voice quality. The present invention relates to methods for estimating subjective voice quality that consider temporal effects and hence can provide greater accuracy.

Distributed applications software can exhibit similar problems. Network or server loading may vary with time, which results in a user experiencing variable response time. It is expected that detailed subjective testing of user satisfaction would reveal similar characteristics to those found in testing telephone networks as the same basic memory processes are at work. The present invention provides a new approach for estimating the subjective quality of distributed applications software.

BACKGROUND OF THE INVENTION

Prior art systems for measuring voice quality, as described by Douskalis (Hewlett Packard 2000), Royer (U.S. Pat. No. 5,710,791) and Di Pietro (U.S. Pat. No. 5,867,813), use centralized test equipment which samples the voice quality from various conversion points. A loop back condition is established at an conversion point, the test equipment transmits a known signal and then compares the received (looped back) signal with the original, thereby estimating delay, distortion and other impairments. This approach provides an accurate measure of voice distortion but only provides this measure for a sample conversion point and under the network conditions that existed at the time of the test. No provision is made in these systems for estimating the effects of the temporal location of impairments on quality.

Another approach currently used for estimating voice quality is to estimate the subjective performance of the voice connection using objectively measured parameters. Models such as the E-Model described by Johannesson, (IEEE Communications Magazine 1997), are able to produce R ratings which can be correlated to user perceived voice quality. This process is applied by a central management system which gathers statistics on noise and delay and then produces an estimate of voice quality. This method as described by Johannesson does not consider the effects of the temporal location of impairments.

Rosenbluth (T1 committee contribution T1A1.7/98-031) described the result of a subjective voice quality test conducted by AT&T. This test employed a set of 60 second voice samples which were corrupted at the beginning, middle and end. Rosenbluth reported that the MOS score typically ranged from 3.8 for a sample corrupted at the beginning to 3.2 for a sample corrupted at the end. Rosenbluth proposed a mathematical model for determining the estimated voice quality of the speech sample which comprised the steps of dividing the sample into segments, computing a MOS score for each segment, computing a weight for each segment that was a function of the proportional position of the segment within the overall sample and then computing the sum of the segment MOS scores multiplied by their respective weights. This approach suffers from several major drawbacks:

(i) Rosenbluth determined the weight for each impairment based on the proportional location of the impairment within the speech segment—i.e. determined a number between 0 and 1 that represented the position of the impairment between the start and the end of the segment. This is counterintuitive as it would give the same weight to an impairment occurring 30 seconds before the end of a one minute call to an impairment occurring 30 minutes before the end of a one hour call whereas the process by which information is lost from human memory is time dependant.

(ii) The equations used by Rosenbluth were computationally complex, which would be acceptable in an off-line determination of voice quality based on recorded data but not for real-time computation.

(iii) Rosenbluth proposed a testing methodology in which a series of short test messages of known time duration could be sent and then the results from each test message combined. Rosenbluth did not consider a test methodology in which quality was continually estimated during the normal operation of the system.

Accordingly, there is a need for a means of estimating subjective quality in a voice communications system that considers the temporal location of impairments and is computationally efficient.

Furthermore, there is a need for a means of estimating subjective quality in a voice communications system that considers the temporal location of impairments and is able to continuously monitor voice quality during the normal operation of the communications system.

Furthermore, there is a need for a means of estimating subjective quality in a video transmission system that considers the temporal location of impairments and is computationally efficient.

Furthermore, there is a need for a means of estimating subjective quality in an audio transmission system that considers the temporal location of impairments and is computationally efficient.

Furthermore, there is a need for a means of estimating subjective quality in a distributed applications software or client-server system that considers the temporal location of impairments and is computationally efficient.

SUMMARY OF THE INVENTION

The present invention provides an improved means of estimating subjective quality in a communications systems wherein the temporal location of impairments within the data stream are considered and the subjective effects of said impairment determined based on the time delay between the occurrence of said impairment and a time reference at which the quality estimate is being determined.

Objects and Advantages

Accordingly, besides the objects and advantages of the present invention described above, several objects and advantages of the present invention are:

(a) to provide a method for estimating the subjective or perceptual quality of a multimedia communications system which considers the temporal location of impairments;

(b) to provide a computationally efficient method for estimating the subjective or perceptual quality of a multimedia communications system; and (c) to provide a computationally efficient method for estimating the subjective or perceptual quality of a distributed applications software system.

Further objects and advantages are to provide a method of estimating subjective quality for an audio or video streaming system in which packetized audio or video is broadcast or multicast through a packet network and for a multimedia conferencing system. Still further objects and advantages will become apparent from consideration of the ensuing description and drawings.

BRIEF DESCRIPTION OF THE DRAWINGS

Embodiments of the invention (the Quality Monitor) are described below by way of example only with reference to FIGS. 1 to 6 of the accompanying drawings, of which:

FIG. 1 shows an example of the use of the Quality Monitor in a multimedia communications system.

FIG. 2 shows an example of the use of the Quality Monitor in a distributed software applications system.

FIG. 3 shows an example of the effects of temporal location on subjective voice quality.

FIG. 4 shows the architecture of the Quality Monitor.

FIG. 5 shows a flowchart for the Quality Monitor.

FIG. 6 shows an example of the operation of the Quality Monitor.

DETAILED DESCRIPTION OF THE INVENTION

Preferred Embodiment

FIG. 1 shows an example of a multimedia communications system. Audio or video source (6) transmits a stream of audio or video data to user interface (5) by means of transmitter (1), transmission network (2) and receiver (3). Transmission network (2) is subject to time varying impairments which may include jitter, noise, distortion, variations in amplitude and other such impairments. Quality Monitor (7) is connected to or contained within Receiver (3), monitors the received data stream and reports the estimated subjective quality to management system (8).

FIG. 2 shows an example of a distributed applications software system. A user interacts with a remote Server (10) by means of User Interface (13), Client Software (12) and Transmission Network (11). Requests from the user for data are submitted via User Interface (13) to Client Software (12). Client Software (12) forwards a representation of the user request through Transmission Network (11) to Server (10). Server (10) sends a response through Transmission Network (11) to Client Software (12). Client Software (12) communicates the response to the user by means of User Interface (13). The response time between the user request and the response may vary depending on the loading and capacity of Transmission Network (11) and Server (10). Quality Monitor (7) is connected to or contained within Client Software (12), monitors the transmitted and received data stream and reports the estimated subjective quality to management system (8).

FIG. 3 shows some results (from Rosenbluth) of the effects of temporal location on subjective quality for a voice communications system, by way of illustration to support understanding of the following description. It can be seen that for an impairment occurring early in the call the subjective voice quality was 3.8, which is quite good quality, whereas the identical impairment occurring at the end of the call resulted in a subjective quality of 3.2, which is considerably lower quality.

FIG. 4. shows the architecture of Quality Monitor (8) as employed in a voice communications system. The structure of Quality Monitor (8) for other applications would be similar however the terminology used for impairments may vary.

Impairment Measurement functions (20), (21), (22) are connected to an Instantaneous Voice Quality $R_i$ function (23) and measure the value of transmission system impairments during a time interval. In the preferred embodiment Impairment Measurement function (21) measures end to end transmission delay, Impairment Measurement function (22) measures packet loss percentage and Impairment Measurement function (20) measures the quality of the base voice coding algorithm.

Instantaneous Voice Quality function (23) is connected to one input of a Comparator (24), an Increment function (27) and a Decrement function (26). The inputs of R Counter (25) are connected to Increment function (27) and Decrement function (26). The outputs of R Counter (25) are connected to Comparator (24), Average function (28), Minimum function (29), Maximum function (30) and to Output to Management System function (31). Average function (28) is fed back to Increment function (27).

FIG. 5 shows a flowchart of the operation of Quality Monitor (8) as employed in a voice communications system.

FIG. 6 shows an example of the output of Quality Monitor (8) as employed in a voice communications system.

Description of Operation

The following sequence of operations is executed at periodic intervals. In the preferred embodiment said periodic interval is one second however shorter or longer times may be used. A transmission quality factor R is determined using the procedures described in detail below. Subjective voice quality is related to quality factor R according to the relationship:

| R | Subjective Voice Quality |
|---|---|
| 90-100 | Very satisfactory/excellent |
| 80-90 | Satisfactory/good |
| 70-80 | Some users dissatisfied/fair |
| 60-70 | Many users dissatisfied/poor |
| 50-60 | Most users dissatisfied |
| 0-50 | Unacceptable |

Impairment measurement function 1 (20) determines the base voice quality factor for a particular voice coding algorithm for $R_c$. Flowchart step Determine Base Quality (40) comprises the process of identifying which voice coding algorithm is being used and then using a predetermined table of values to determine the value $R_c$. A typical initial $R_c$ value for a voice coding algorithm is 84.

Impairment measurement function 2 (21) determines the quality reduction due to the end to end transmission delay. Flowchart step Determine Quality Degradation (41) comprises the process of using the measured end to end delay to determine the delay quality degradation factor $R_d$. In the preferred embodiment this is determined using the piecewise linear approximation:

| | |
|---|---|
| If delay < 175 mS then | Flowchart Step 41 |
| $R_d$ = delay * a | |
| else | |
| $R_d$ = (delay − b) * c | |

In the preferred embodiment delay is the one way transmission delay plus the delay due to the voice compression process, a=0.02, b=147 and c=0.125 however other values may be used.

Impairment measurement function 3 (22) determines the quality reduction due to the percentage of voice packets lost since the last measurement. Flowchart step Determine Quality Degradation (42) comprises the process of using the measured packet loss to determine the packet loss quality degradation $R_p$. In the preferred embodiment this is determined using the piecewise linear approximation:

| | |
|---|---|
| If loss < 5% then | Flowchart step 42 |
| $R_p$ = loss * $e_1$ | |
| else | |
| $R_p$ = loss*$e_2$ + f * ($e_1$ − $e_2$) | |

In the preferred embodiment loss is the percentage of packets lost since the last measurement, $e_1$=4, $e_2$=2.5 and f=5 however other values may be used. Preferably the values of $e_1$ and $e_2$ are obtained from a table which holds specific values for each voice coding algorithm.

The instantaneous voice quality factor $R_i$ (23) is then determined by subtracting the reduction factors (21) and (22) from the base R value (20) for the voice coding algorithm. Flowchart step Determine Voice Quality Factor (43) comprises the process of using the previously determined quality factors to determine the value of $R_i$ (23):

$R_i = R_c - R_d - R_p$

Comparator (24 and flowchart step 44) is used to determine if the value of Counter (25), which represents the voice quality factor R, should be increased or decreased. If $R_i$ (23) is low then the user is experiencing poor quality and voice quality factor R (25) is decreased rapidly. If $R_i$ (23) is high then the user is experiencing good quality and voice quality factor R (25) is increased exponentially towards the average voice quality factor $R_{av}$ (28).

| | |
|---|---|
| If R < $R_i$ then | flowchart step 44 |
| R = R + ($R_{av}$ − R)/ g | flowchart step 45 |
| else | |
| R = R − h | flowchart step 46 |

In the preferred embodiment g=200 and h=4 however other values may be used.

Flowchart step 47 updates the average (28), minimum (29) and maximum (30) values of R (25). The average voice quality factor $R_{av}$ (28) is determined by adding the value $R_i$ to a sum $R_{sum}$, incrementing a count of the number of values and dividing $R_{sum}$ by said count:

$R_{sum} = R_{sum} + R_i$ $N = N+1$ $R_{av} = R_{sum}/N$

The maximum and minimum values of R are determined by setting $R_{max}$ (30) equal to R (25) if R ever exceeds $R_{max}$ and by setting $R_{min}$ (29) equal to R if R is ever below $R_{min}$.

The parameters R (25), $R_{av}$ (28), $R_{min}$ (29) and $R_{max}$ (30) are updated according to the procedures described above at regular intervals, preferably every second, and the values may be read at any time by a central management system through Output to Management System (31) or may be incorporated into an end-of-call record for later analysis.

Alternative Embodiments

The subjective effects of additional impairments such as jitter, clipping, noise and amplitude limiting may be determined and subtracted from the value of $R_i$ using the same basic procedures as described above.

The value of $R_{av}$ may be determined either by averaging the output value R or the instantaneous value $R_i$.

The periodically obtained sets of measured impairment values may be stored and at some later time retrieved for analysis using the same procedure described above.

An alternative means of determining a quality factor that represents the temporal position of impairments is to measure the impairment values at regular intervals, at each such interval to compute an estimated subjective quality value, and to compute a weighted sum of each subjective quality value multiplied by a function of the time difference between the time at which the impairment measurement was made and the time reference for which the subjective quality is being determined.

The present invention may be used to measure the subjective quality of a distributed applications system, as shown in FIG. 2. The measured impairments would include signal reception data rate and response time, both of which may be affected either by network bandwidth or server loading.

Conclusion, Ramifications and Scope

One benefit of the present invention is that the subjective speech quality of a voice communications system may be determined more accurately as the effects of the temporal location of impairments are considered.

Another benefit of the present invention is that the computational complexity is low and hence the quality monitoring system can be implemented at low cost.

Although the description above contains many specifics these should not be construed as limiting the scope of the invention but as merely providing illustrations of some of the presently preferred embodiments of this invention. For example, the present invention could be used for monitoring the quality of a cellular telephone system, a digital broadcast video system or the user interface on a software application.

Thus the scope of the invention should be determined by the appended claims and their legal equivalents, rather than by the examples given.

I claim:

1. A method for estimating a subjective quality of a signal carried over a transmission path comprising the steps of:
   (a) monitoring said transmission path at periodic intervals;
   (b) for each of said periodic intervals:
      (i) measuring at least one impairment factor;
      (ii) determining an estimated effect of each of said at least one impairment factor using at least one value; and
      (iii) determining an estimated subjective quality of said signal using said estimated effect of each of said at least one impairment factor; and
   (c) determining an estimated combined subjective quality of said signal using said estimated subjective quality for at least two of said periodic intervals.

2. A method as defined in claim 1 wherein said signal is selected from the group consisting of digital voice, digital audio and digital video.

3. A method as defined in claim in claim 1 wherein said at least one impairment factor is selected from the group consisting of packet delay and packet loss.

4. A method as defined in claim 1, further comprising the steps of, for of said periodic intervals:
   (a) comparing said estimated subjective quality to a maximum value and if said estimated subjective quality is greater than said maximum value then setting said maximum value equal to said estimated subjective quality; and
   (b) comparing said estimated subjective quality to a minimum value and if said estimated subjective quality is less than said minimum value then setting said minimum value equal to said estimated subjective quality.

5. A method as defined in claim 1, further comprising the steps of, for of said periodic intervals:
   (a) adding said estimated subjective quality to a sum of said estimated subjective quality;
   (b) incrementing a count of said periodic intervals; and
   (c) calculating an average estimated subjective quality by dividing said sum by said count.

6. A method as defined in claim 1 wherein said transmission path is within a cellular telephone system and wherein said step of monitoring said transmission path at periodic intervals is performed at a cellular telephone.

7. A method as defined in claim 1 wherein said transmission path is within a digital broadcast video system and said step of monitoring said transmission path at periodic intervals is performed adjacent to or within a video decoder or a digital set top box or a mobile handset.

8. A method as defined in claim 1 wherein said step of monitoring said transmission path at periodic intervals is performed at the user interface of a software application.

9. A method for estimating a subjective quality of a signal carried by a sequence of packets over a transmission network, the method being performed by a quality monitoring device and comprising the steps of:
   (a) monitoring, by said quality monitoring device, the transmission path at periodic intervals;
   (b) during each of said periodic intervals:
      (i) monitoring, by said quality monitoring device, each packet within the sequence;
      (ii) measuring, by said quality monitoring device, the transmission delay for each of said packets;
      (iii) measuring, by said quality monitoring device, whether any of said packets were lost in transmission;
   (c) at the end of each of said periodic intervals, determining an estimated subjective quality of said signal using the measurements of steps (b)(i) and (b)(ii);
   (d) determining an estimated combined subjective quality of said signal by combining the estimated subjective quality measured in step (c) for at least two of said periodic intervals.

10. A method as defined in claim 9 wherein said signal is selected from the group consisting of digital voice, digital audio, and digital video.

11. A method as defined in claim 9, further comprising the steps of, for said periodic intervals:
   (a) comparing said estimated subjective quality to a maximum value and if said estimated subjective quality is greater than said maximum value then setting said maximum value equal to said estimated subjective quality; and
   (b) comparing said estimated subjective quality to a minimum value and if said estimated subjective quality is less than said minimum value then setting said minimum value equal to said estimated subjective quality.

12. A method as defined in claim 9, further comprising the steps of, for said periodic intervals:
   (a) adding said estimated subjective quality to a sum of said estimated subjective quality;
   (b) incrementing a count of said periodic intervals; and
   (c) calculating an average estimated subjective quality by dividing said sum by said count.

* * * * *